March 19, 1968  F. E. HARRIS  3,373,595
COMBINED SPIKE AND ANCHOR MEMBER AND MANUFACTURE THEREOF
Filed Dec. 10, 1964  9 Sheets-Sheet 1

INVENTOR.
FOSTER E. HARRIS
BY
HIS ATTORNEYS

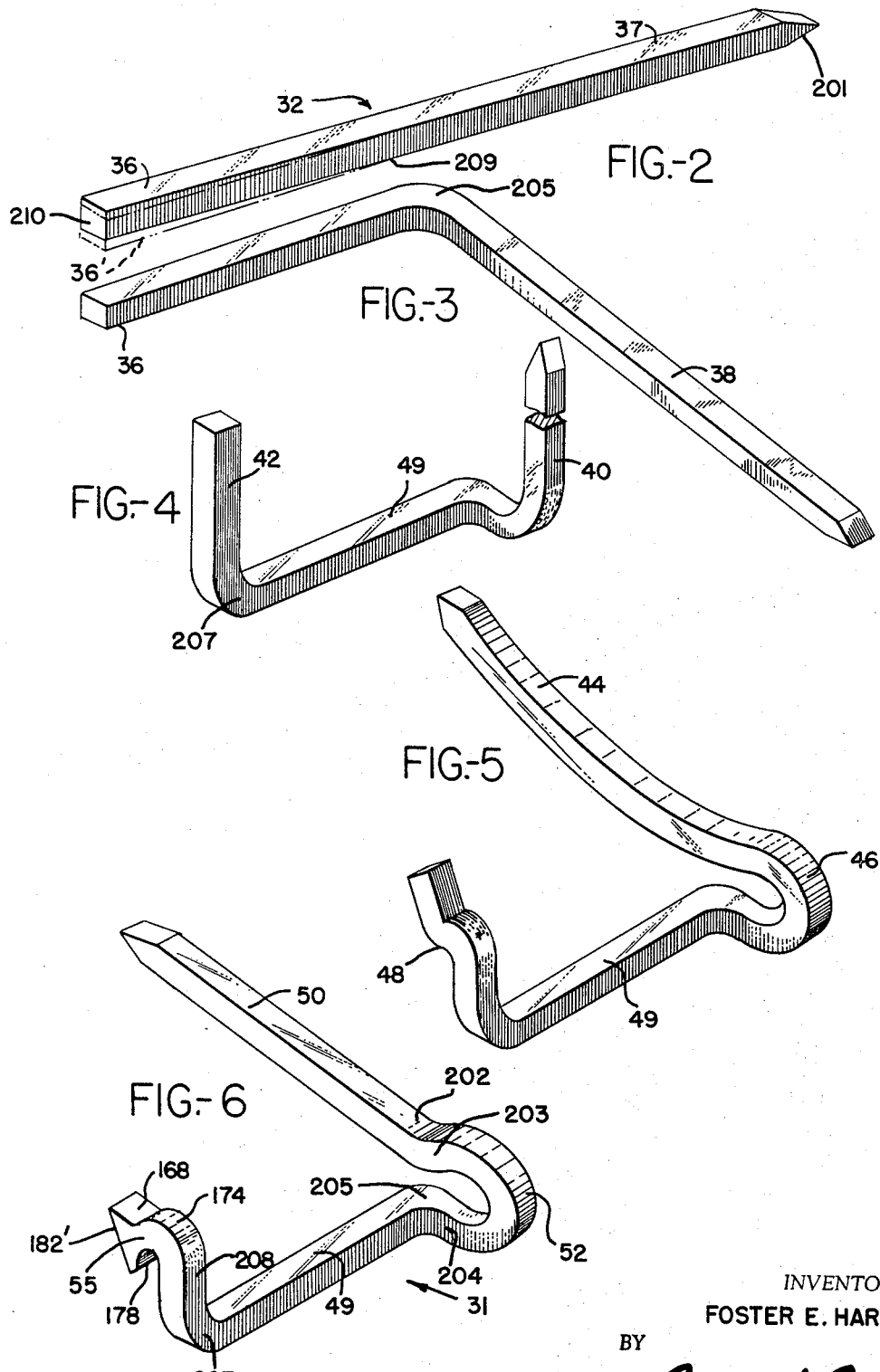

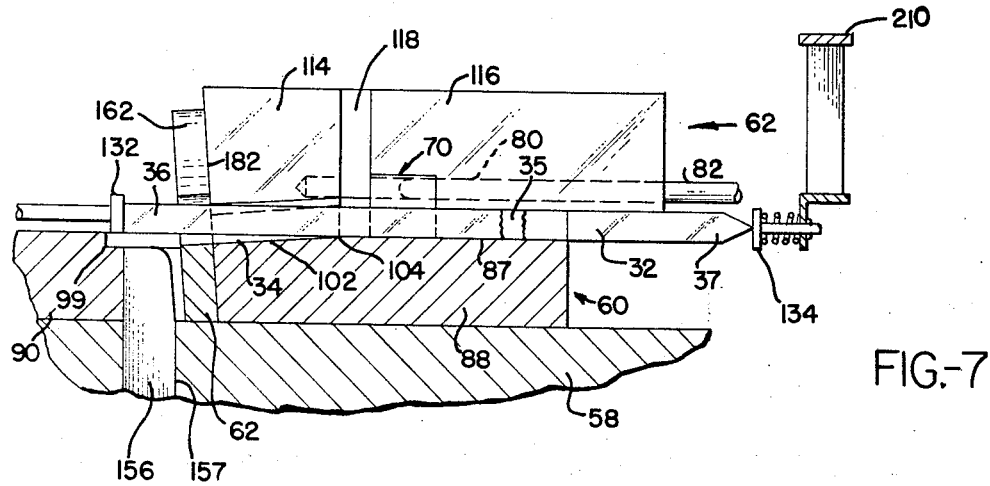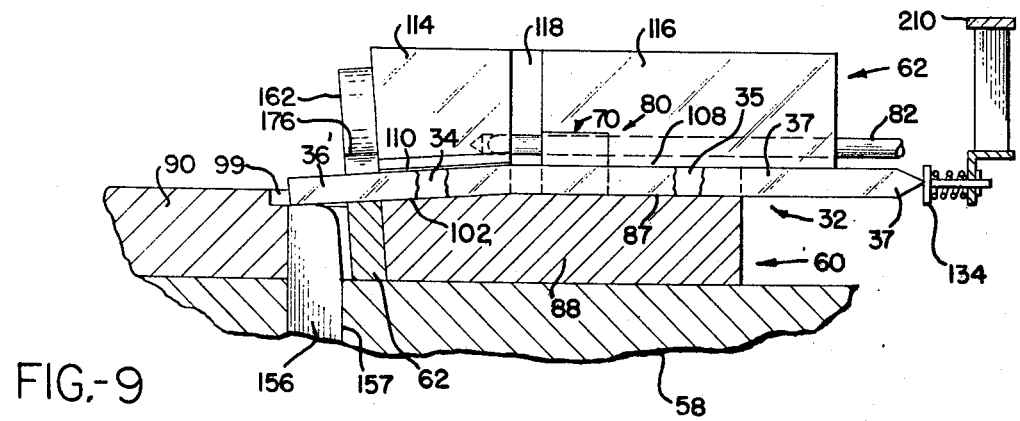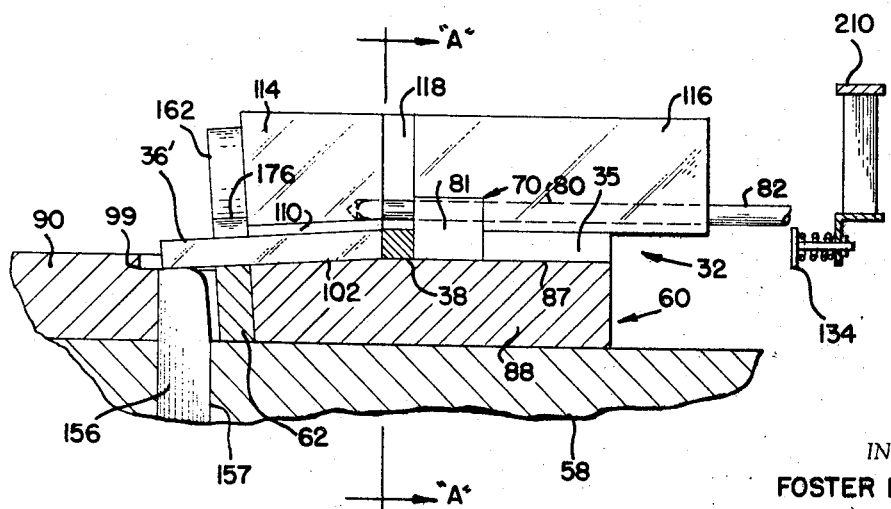

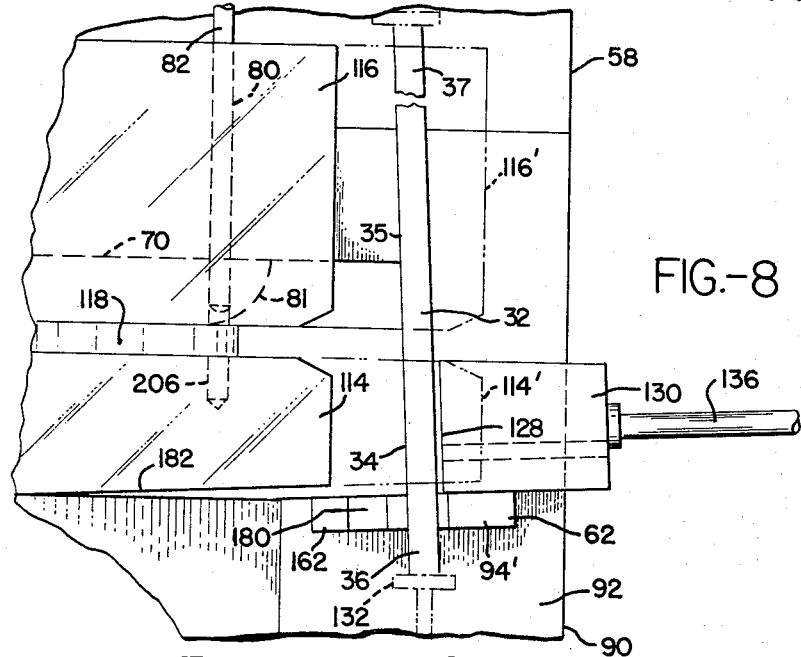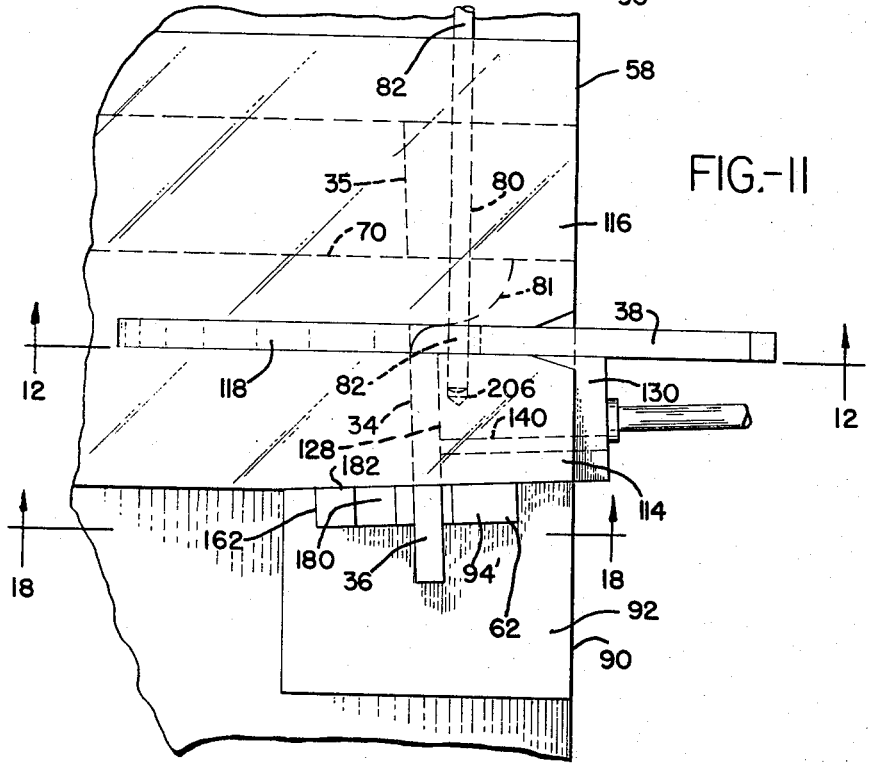

INVENTOR.
FOSTER E. HARRIS
BY
*Randor & Randor*
HIS ATTORNEYS

March 19, 1968    F. E. HARRIS    3,373,595
COMBINED SPIKE AND ANCHOR MEMBER AND MANUFACTURE THEREOF
Filed Dec. 10, 1964    9 Sheets-Sheet 6

INVENTOR.
FOSTER E. HARRIS
BY
HIS ATTORNEYS

INVENTOR.
FOSTER E. HARRIS
BY
*Cauder Rauder*
HIS ATTORNEYS

INVENTOR.
FOSTER E. HARRIS
BY
*Cauder & Cauder*
HIS ATTORNEYS

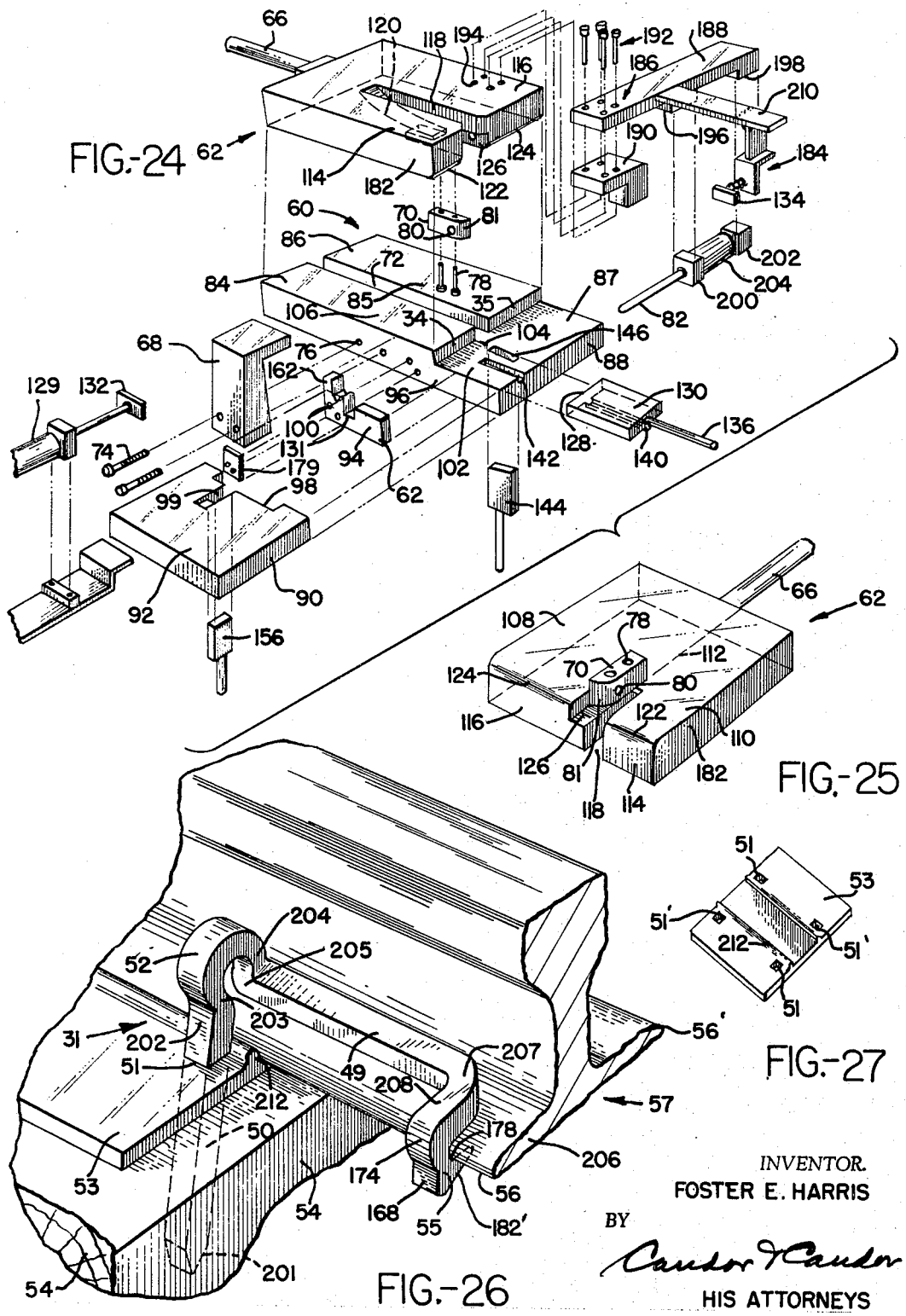

United States Patent Office 3,373,595
Patented Mar. 19, 1968

3,373,595
COMBINED SPIKE AND ANCHOR MEMBER
AND MANUFACTURE THEREOF
Foster E. Harris, Harrison Township, Montgomery
County, Ohio (300 Heikes Ave., Dayton, Ohio
45405)
Filed Dec. 10, 1964, Ser. No. 417,448
13 Claims. (Cl. 72—403)

ABSTRACT OF THE DISCLOSURE

This application discloses an apparatus for manufacturing a combined spike and anchor member. Such combined member has a spike which has a pointed end and a curved upper end, a sidewise anchor arm to rest on top of the lower flange of a railroad rail, and a forward hook member to hook around the edge of such lower flange. The apparatus bends a rectangular cross-sectioned pointed bar by various steps to produce the combined spike and anchor member. The straight spike portion of the member is driven through a hole in a tie plate beneath the rail. The tie plate rests on a railroad tie so that the horizontal arm of the anchor part rests on top of such lower flange of the railroad rail and the forward hook of the anchor part is hooked over the edge of such lower flange. The various components of the apparatus for performing the bending steps on the bar are shown in the drawings.

---

This invention relates to a combined spike and anchor member nad manufacture thereof.

This invention includes an apparatus and method for the manufacture of such combined spike and anchor member.

The apparatus and method include means whereby a straight bar may be received, bent and formed into the final form of such combined spike and anchor member.

Such apparatus and method are capable of operating on such straight bar while the bar is at high temperatures in a safe and efficient manner.

A plurality of sequential steps are performed on the high temperature bar which are coordinated in a central zone so that the straight bar is bent and formed with a minimum of coordinated operations and a maximum of safe conditions.

Other features and advantages are apparent from this description, the appended claimed subject matter, and the accompanying drawings, in which:

FIGURES 2–6 are perspective views of the combined spike and anchor member in sequential stages of formation which take place in the apparatus of FIGURE 1.

FIGURE 7 is a vertical cross section of certain parts of FIGURE 1, substantially along the axis line x—x of FIGURE 1, with such machine parts in the position of FIGURE 1 and receiving a bar which will form the spike and anchor member, the bar being shown in the straight, full line condition of FIGURE 2.

FIGURE 8 is a plan view of the parts of FIGURE 7.

FIGURE 9 is a view similar to FIGURE 7 with the upper forming members having moved over the bar to bend the bar to the dotted line stage of FIGURE 2.

FIGURE 10 is a view similar to FIGURES 7 and 9 with the upper forming members having moved to the full line positions of FIGURE 11 to bend the bar to the stage shown in FIGURE 3.

FIGURE 11 is a plan view of the parts of FIGURE 10.

FIGURE 24 is an exploded perspective view of certain parts of the apparatus shown in FIGURE 1.

FIGURE 25 is a perspective view of the massive bending block turned upside down to show its bottom formation.

FIGURE 26 is a perspective view of the finished combined spike and anchor member applied to a railroad rail, a tie plate and a railroad tie.

FIGURE 27 is a diagrammatic perspective view of a tie plate such as shown in FIGURE 26.

Figure 1:
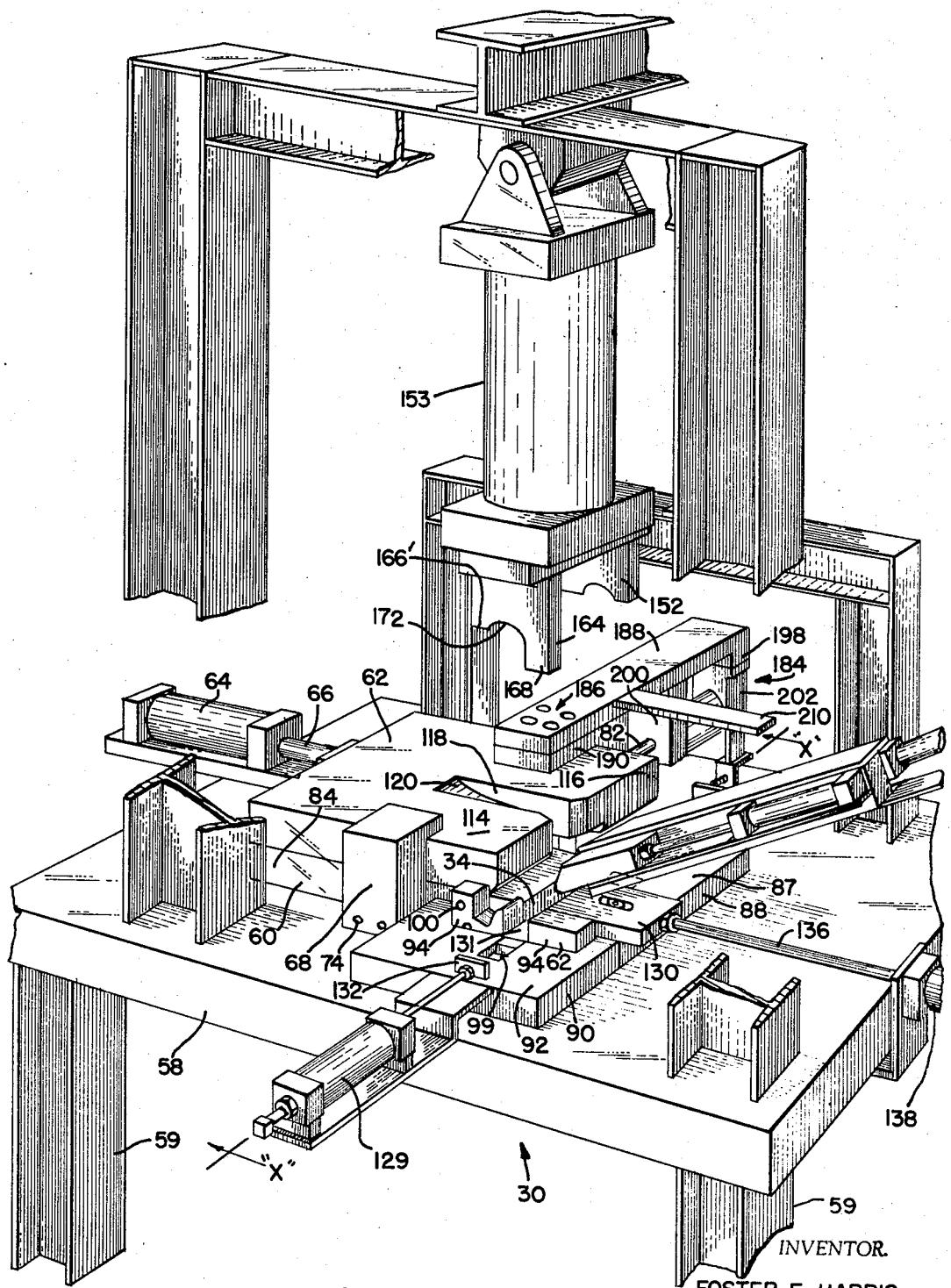
FIGURE 1 is a perspective view of certain parts of an apparatus for forming the combined spike and anchor member.

For the sake of brevity and clearness, certain words are used in the specification and claims which indicate direction, relative position, and the like. However, it is to be understood that these words are to be used only in connection with the illustrations in the drawings, and that the actual parts so described may have entirely different directions, relative positions, and the like, when in actual use. Examples of such words are "upper," "lower," "vertical," "horizontal," and the like.

An apparatus 30 is shown diagrammatically in perspective in FIGURE 1 which produces the combined spike and anchor member 31, of FIGURES 6 and 26. This apparatus 30 receives a preformed rectangular cross-sectioned and pointed bar 32, which is shown in FIGURES 2, 7 and 8. This bar 32 is received horizontally and at high temperature in the apparatus 30 of FIGURE 1 substantially as shown in FIGURES 7 and 8. The bar 32 is positioned in the apparatus 30 by certain parts of the apparatus to hold the bar against the vertical walls 34 and 35 which are shown in FIGURES 7, 8 and 24. The bar 32 is initially held substantially along the axis x—x of FIGURE 1.

The bar 32 then has its left end 36 bent to produce a bent left end 36', or anchor forming end, as indicated in dotted lines in FIGURE 2, and in full lines in FIGURES 9 and 10. This bend of the end 36 may be downward, in the order of 4° 15', for example, with respect to the original straight axis of the bar 32.

Thereafter, the right end, or spike forming end 37 of the bar 32 may be bent horizontally at right angles, to produce the right angled bent portion 38 of FIGURES 3, 10, 11 and 12.

Figure 13:
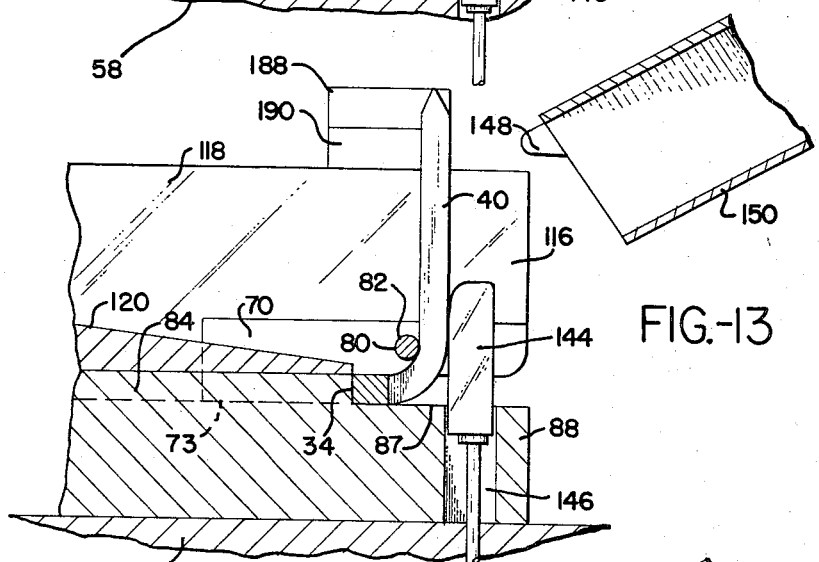
FIGURE 13 is a view similar to FIGURE 12 and showing a vertical plunger upwardly bending a portion of the partially formed spike and anchor member to produce the right hand upward bend of FIGURE 4.
Figure 19:
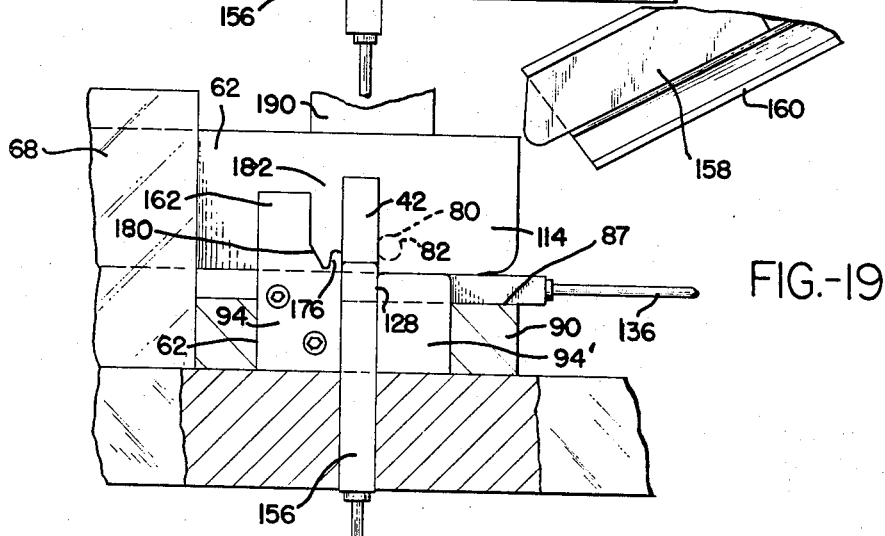
FIGURE 19 is a view similar to FIGURE 18 showing certain parts moved upwardly to produce the upward bend of the product as shown in the left portion of FIGURE 4.

Thereafter, the bar 32 may have its right end upwardly bent at 40 as shown in FIGURES 4 and 13. Also, the left end of bar 32 may be upwardly bent at 42, as shown in FIGURES 4 and 19.

Figure 14:
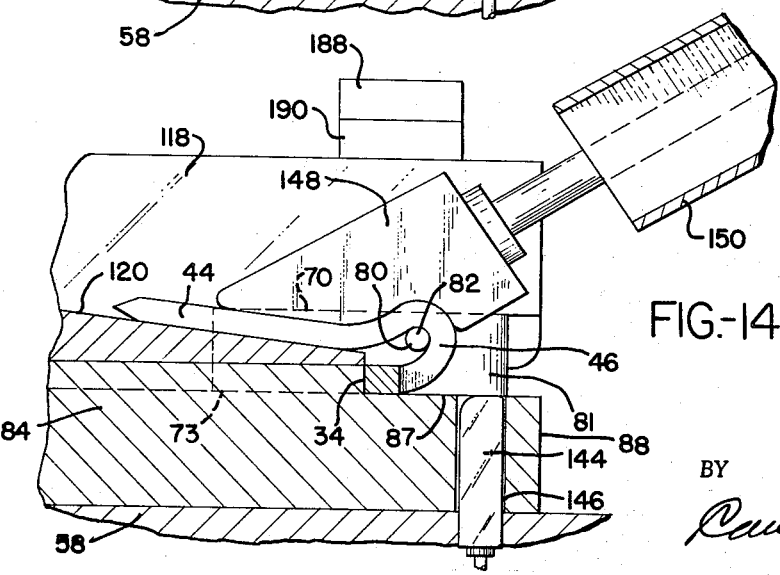
FIGURE 14 is a view similar to FIGURE 13 showing certain parts moved to produce the right hand downward bend of the partly formed spike and anchor member shown in FIGURE 5.

Thereafter, the upward end 40 of FIGURE 4 may be downwardly bent at 44, as shown in FIGURES 5 and 14 while simultaneously producing the curl 46, also of FIGURES 5 and 14.

Figure 20:
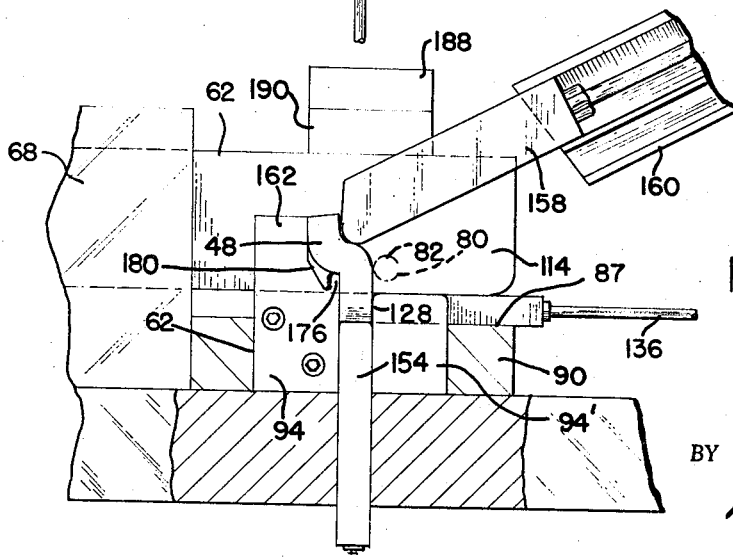
FIGURE 20 is a view similar to FIGURES 18 and 19 and showing the parts in a later stage to produce the zigzag of offset portion shown in the left portion of FIGURE 5.
Figure 21:
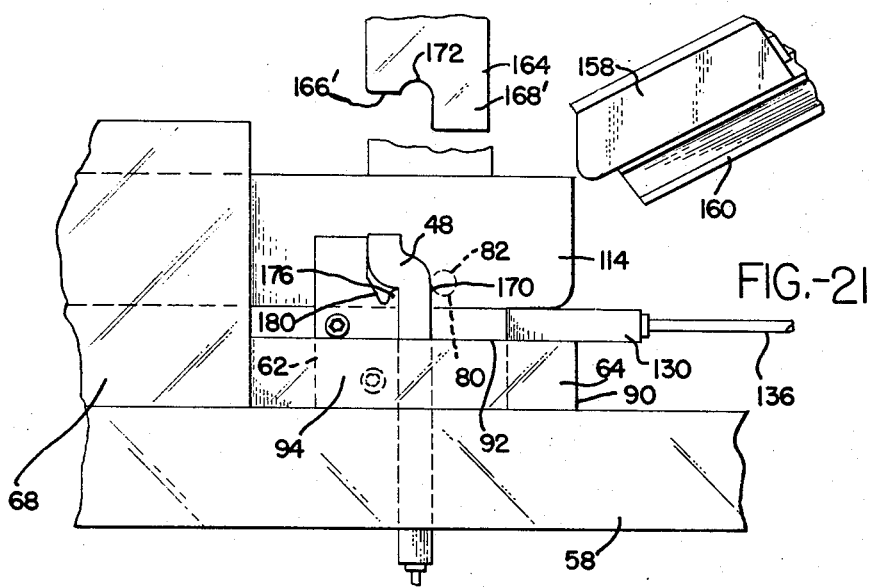
FIGURES 21–23 are views similar to FIGURE 20 showing the apparatus and product in later stages to produce the formed left portion of the product shown in FIGURE 6.

Substantially at the same time, the left end 42 of the bar may be given a zigzag formation 48, shown in FIGURES 5, 20 and 21. This operation also forms a portion 49 which will hold the railroad rail 57 down against the tie plate 54, as shown in FIGURE 26.

Figure 15:
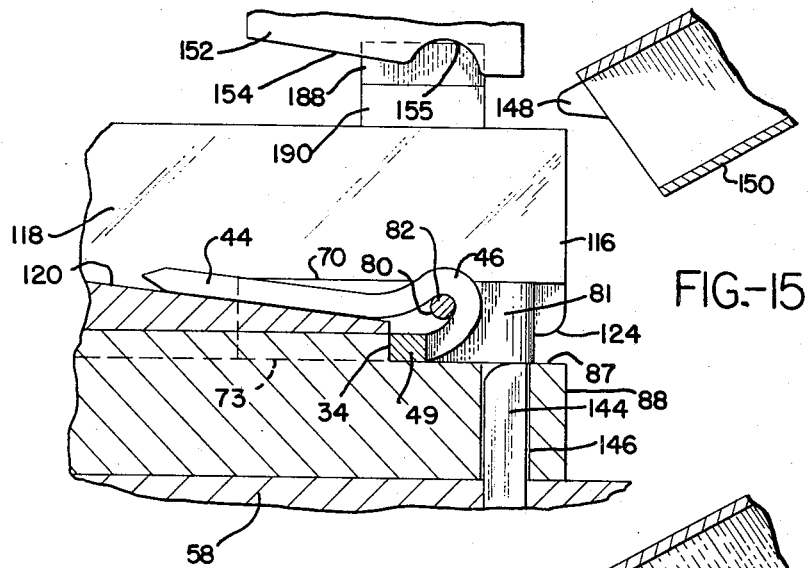
FIGURE 15 is a view similar to FIGURE 14 showing a later stage of movement of the parts.
Figure 16:
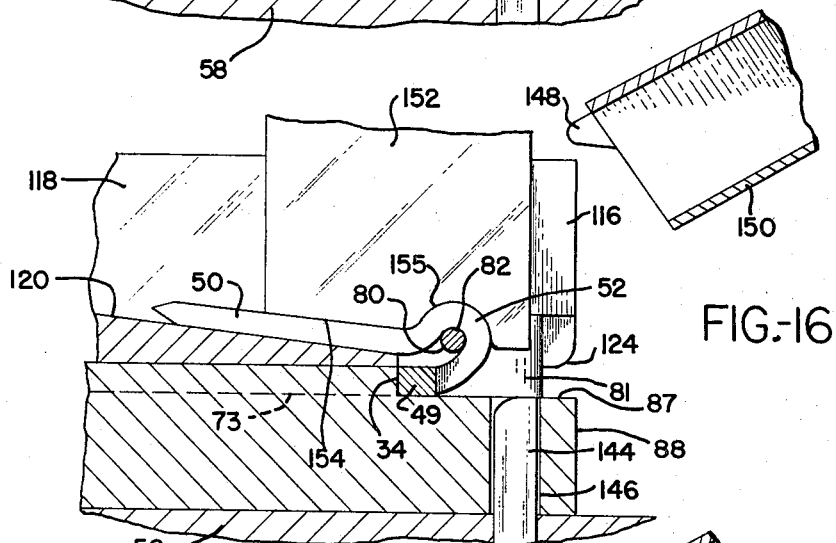
FIGURE 16 is a view similar to FIGURE 15 showing a forming head moved down to straighten the right hand portion of the spike and anchor member as shown in FIGURE 6.
Figure 17:
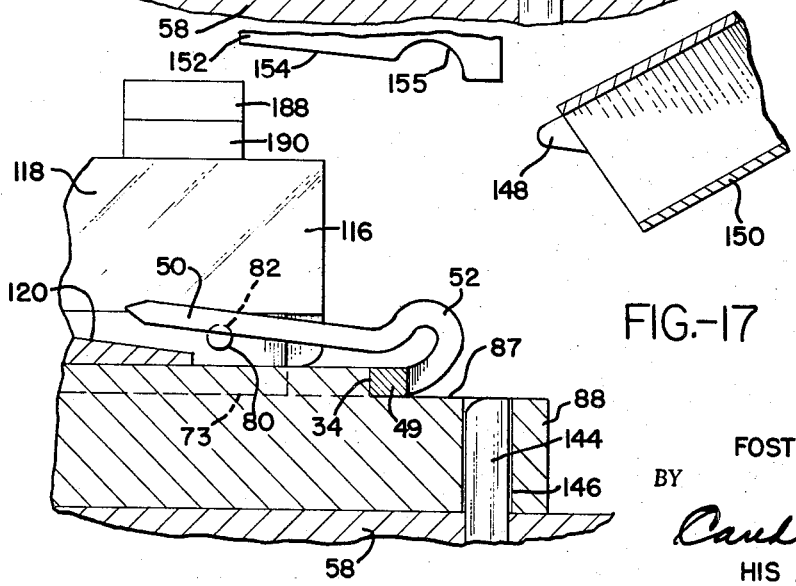
FIGURE 17 shows a later stage of the parts of FIGURE 16.

Thereafter, the right end 44 of FIGURE 5 may be straightened to produce the straight spike portion 50 of FIGURES 6, 16 and 17, and the original curl 46 of FIGURES 5, 14 and 15 may be given more uniform curl, as at 52 in FIGURES 5, 16 and 17. The straight portion 50 is to be driven through an opening 51 in the tie plate 53, into the railroad tie 54, FIGURE 26.

Figure 22:
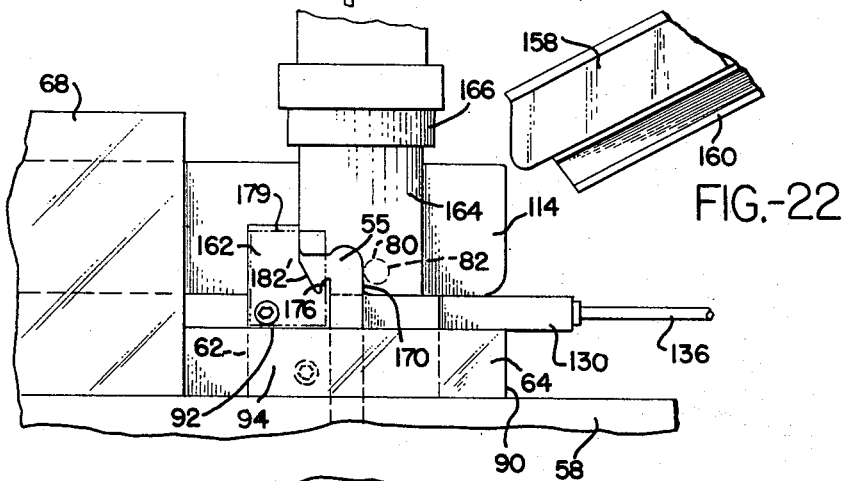
Figure 23:
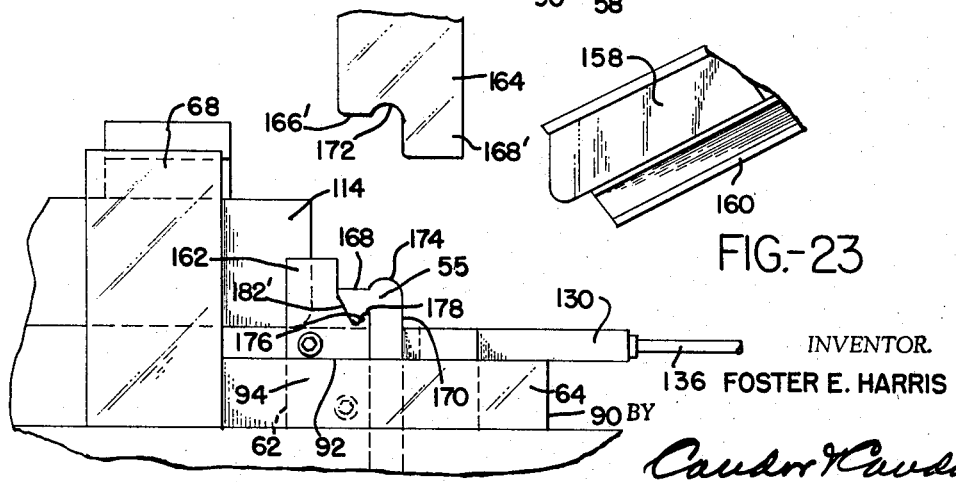

Substantially, at the same time, the zigzag formation 48 of FIGURES 5 and 20 may be given a stamping like formation 55, as shown in FIGURES 6, 22 and 23. This formation 55 anchors the edge 56 of the rail 57 against longitudinal movement of the rail.

All of the foregoing forming operations, described in connection with the formation of the product as illustrated in FIGURES 2–6 may be produced while the article is in a cold or heated condition. Such bar 32 may be rectangularly or square cross-sectioned, if desired, and may be made substantially ⅝ of an inch along each side, and prepointed and of the correct length to produce the combined spike and anchor member.

For example, the bar 32 may be made from carbon or alloy steels, hot rolled, cold rolled, drop forged, or otherwise formed. Heat treatment may follow forming operations.

By way of example, the apparatus of FIGURES 1 and 24 may include a heavy right angled main metallic plate or main base 58, which is supported on suitable rigid metallic supports 59. Other stationary metallic supports may be provided as illustrated. A sub-base or plate 60 may be rigidly secured to the main base 58 by welding or the like.

A massive bar bending block 62 is horizontally movable and slidable on the top of the sub-base 60 and is moved by means of the fluid operated piston-cylinder 64 and the connecting shaft 66. The cylinder 64 is stationarily supported on main base 58.

The block 62 is held downwardly by the L-shaped guide member 68 on the left side. The right side of the block is held down by a guide member similar to guide member 68, not shown, on the right side of block 62, just behind bar 188, FIGURE 1. Also, the block 62 is guided in its reciprocating movement by the shaft 66 and by a combined bar bending and guiding member 70 (FIGURE 25), which is downwardly directed in actual use, and which slides in a groove 72 which is formed in the sub-base 60.

The guide member 68 may be bolted, by screw bolts 74, to the sub-base 60 in bolt holes 76 so the member 68 and bending block 62 may be attached to and detached from the sub-base 60. The additional guide member, not shown, on the other side of bending block 62 may be similarly bolted.

Figure 12:
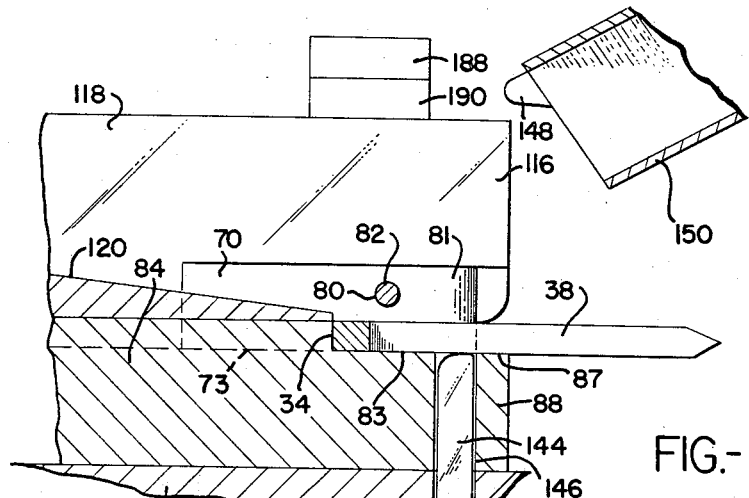
FIGURE 12 is a vertical cross section along the line 12—12 of FIGURE 11.

The combined bar bending and guiding member 70 may be welded or bolted, by screw bolts 78, to the under side of the bar bending block 62. The guiding member 70 has a horizontal hole or passageway 80 through which a bar curling pin or rod 82 may pass at the proper time as herein elsewhere described. The member 70 has a front, curved, bar bending surface 81 which bends the bar 32 to produce the right angled bent portion 38 of FIGURE 3 as shown in FIGURES 11 and 12.

The sub-base 60 has two higher level platforms 84 and 86 on either side of the groove 72 and a lower level platform 87. The bottom surface 73 of the groove 72 and the upper surface 87 of a lower level platform 88 are at a level which is below the top surface 85 of the platform 86 a distance substantially equal to the thickness of the sides of the bar 32, which, in the example elsewhere given, is ⅝ inch. The difference in level between the upper platforms 84 and 86 as compared to the lower platform 88 is indicated by the vertical walls 34 and 35, FIGURES 8, 9 and 24.

A lower level second sub-base 90 may be bolted or welded to the main base 58 and sub-base 90 has an upper surface 92 substantially at the same level as the upper surface 87.

A stamping die plate 94 may rest on the main base 58 and may be held between the side wall 96 of the sub-base 60 and the notch 98 in the second sub-base 90. If desired, the plate 94 may be bolted at 100 to the side wall 96 of sub-base 60.

A second notch 99 is provided in the second sub-base 90 to receive the end 36 of the bar 32, as shown in FIGURE 7.

The upper surface 102 of the platform 88 on the left side of the line 104, FIGURE 24, to the side wall 96 is slanted at an angle of 4° 15', for example, from the level top surface 87 which is on the right side of the line 104. Likewise the top surface 106 of the platform 84 is slanted at the same angle (4° 15', for example) with respect to the level top surface 85 of the platform 86.

The bottom of the bending block 62 has bottom surfaces 108 and 110 on opposite sides of line 112, FIGURE 25, which are at the same angle (4° 15', for example) with respect to each other. When the block of FIGURE 25 is turned upside down to the normal position of FIGURES 24 and 1, the surface 108, FIGURE 25, will be level and will slide on the upper surface of platform 86, FIGURE 24. Also the surface 110, FIGURE 25, will slant at 4° 15' for example and will ride on the upper surface of platform 84, FIGURE 24.

When the bending block 62 is moved over the bar 32, as shown in FIGURE 9, the left end of bar 32 will be bent downwardly at an angle of 4° 15' because of the slanting surfaces 102 and 110 (FIGURES 9, 24 and 25) of the blocks 88 and 62 respectively. At the same time the right end of bar 32 will be maintained level, as shown in FIGURE 9, because of the level surfaces 87 and 108 of the blocks 88 and 62 respectively (FIGURES 24 and 25).

The massive bar bending block 62 has two prongs 114 and 116 which are separated by the grove 118. The groove 118 has a slanting bottom 120 (FIGURES 1, and 12–17) which produces the spike portions 44 and 50 of FIGURES 5 and 6.

The forward lower surfaces or edges 122 and 124 of the prongs 114 and 116 are curved upwardly at their lower edges so that the prongs can ride over the bar 32 and press the bar down as the prongs move forwardly over the bar. However a notch 126 is provided at the inner edge of prong 116 to allow the prong 116 to ride completely over the bar 32 before the bar is bent, in FIGURES 11 and 12, to form the right angled bent portion 38 of FIGURE 3.

When the bar 32 is first placed on the apparatus, one side of the bar is placed adjacent the vertical walls 34 and 35, FIGURES 7 and 8, and adjacent the pushing end 128 of the pusher plate 130. The pushing end 128 will be pushed leftwardly in FIGURE 8 firmly to hold the bar 32 against the vertical walls 34 and 35. However, the bar 32 was also placed in a groove 131 which is formed in the center of the plate 94. The left end of groove 131 is aligned with the vertical wall 34, FIGURE 1, so that the bar can be loosely held in the groove 131 adjacent the vertical walls 34 and 35. As soon as the bar is placed in the groove 131, a piston-cylinder 129 pushes a longitudinal pusher plate 132 to push the end 36 of bar 32 a predetermined distance so that the other end 37 of the bar 32 is pushed against the spring biased plate 134 longitudinally to position the bar between the vertical surfaces 34 and 35 and the pusher end 128. Then the end 128 of pusher plate 130 is pushed leftwardly, in FIGURE 8, firmly to clamp the bar against the vertical surfaces 34 and 35.

The pusher plate 130 is reciprocated by the shaft 136 and by the piston-cylinder 138. The bottom of plate 130 has a downward spline 140 which slides in the groove 142 to guide the plate 130 as it slides on the surface 102 of the platform 88, to clamp the bar 32 against the vertical surfaces 34 and 35. The bar is then held in the position shown in FIGURES 7 and 8.

Thereafter, the prongs 114 and 116 are moved over the bar 32 to the dotted line positions 114' and 116' shown in FIGURE 8 and the full line position of FIGURE 9. This bends the left end 36 of the bar 32 downwardly to the full line position 36' of FIGURE 9. This bending operation is produced by the 4° 15' slanting surface 110 of prong 114 and slanting surface 102 of platform 88, FIGURE 9. The slightly obtuse angular position of bar 32, FIGURE 8, is such that prong 116 travels over bar end 37 and holds it down before the prong 114 passes over bar end 36 to bend it down to position 36' of FIGURE 2.

Further movement of the prongs 114 and 116 to the positions of FIGURES 11 and 12 causes the formation of the right angled bent portion 38 of bar 32. This right angled bend is produced by the curved bending surface 81 of the bending member 70 which is carried by the prong 116. This action produces the intermediate product shown in FIGURE 3. The portion 38 of the product has been bent against the adjacent side of the pusher plate 130 which is under the prong 114, as shown in FIGURE 11.

In the meantime, the bending rod 82, which is always carried in the prong 116, has been pushed inward into the prong 114 by means elsewhere described. The bending actions can then take place around such bending rod 82, as shown in FIGURES 12-16.

In FIGURES 12 and 13, an upward bending plunger 144 rises from the hole 146 in the platform 88 and bends the horizontal portion 38 of FIGURE 12 into the vertical portion 40 of FIGURE 13, the bend being produced around the bending rod 82. This vertical portion 40 is also shown in FIGURE 4. This portion 40 is bent into the groove 118 which is between the prongs 114 and 116.

In FIGURES 13 and 14 the upward portion 40 of FIGURE 13 is bent down to form the downwardly bent portion 44 and the preliminary curl 46 of the bar 32, which are also shown in FIGURE 5. A slanting plunger 148 moves downwardly and leftwardly from within the channel-shaped sleeve 150 into the groove 118 to the position shown in FIGURE 14 to produce the bent portion 44 and preliminary curl 46. The portion 44 is bent down against the bottom 120 of the groove 118, and the preliminary curl 46 is formed around the rod 82. The lower surface of the plunger 148 is properly shaped to produce these bending actions.

In FIGURE 15 the plunger 148 has been retracted upwardly into channel sleeve 150 to provide clearance for the downward movement of vertically reciprocable plunger or punch 152. This punch 152 is pushed down by fluid operated piston-cylinder 153 of FIGURE 1 into the groove 118, as shown in FIGURE 16, to produce the straight spike portion 50 and the more finished curl 52 which are also shown in FIGURE 6. The bottom of punch 152 is provided with a straight surface 154 and a curved surface 155 to straighten the portion 50 against the bottom 120 of the groove 118 and to curl the more finished curl 52 around the rod 82, as shown in FIGURE 16.

Before the prong 116 (and prong 114) is moved leftwardly as shown in FIGURE 17, the punch 152 is moved upwardly and the rod 82 is retracted from the groove 118 and the prong 114 which cannot be seen in FIGURE 16. Thereafter, the prongs 116 and 114 and the bottom member 120 of the groove 118 are moved leftwardly to their fully retracted positions. The rod 82 has been retracted from the curl 52 so that such curl 52 is not deformed by the leftward movement of the rod 82. The portion 49 of bar 32, which is also shown in FIGURES 6 and 26, remains against the vertical wall 34 and prevents the product from being pulled leftwardly with the prongs 114 and 116.

Several operations simultaneously occur in connection with the prong 114 and the left end of bar 32, as shown in FIGURES 7-9 and 18-22 while the foregoing operations take place with regard to the right end of the bar 32, which have been described in connection with FIGURES 10-17.

FIGURES 7-9 show how the left end of the bar 32 is bent down to form the downwardly bent portion 36', and this operation has been described.

FIGURES 18-22 show how the left end of bar 32 is formed into the rail edge anchor formation 55.

Figure 18:
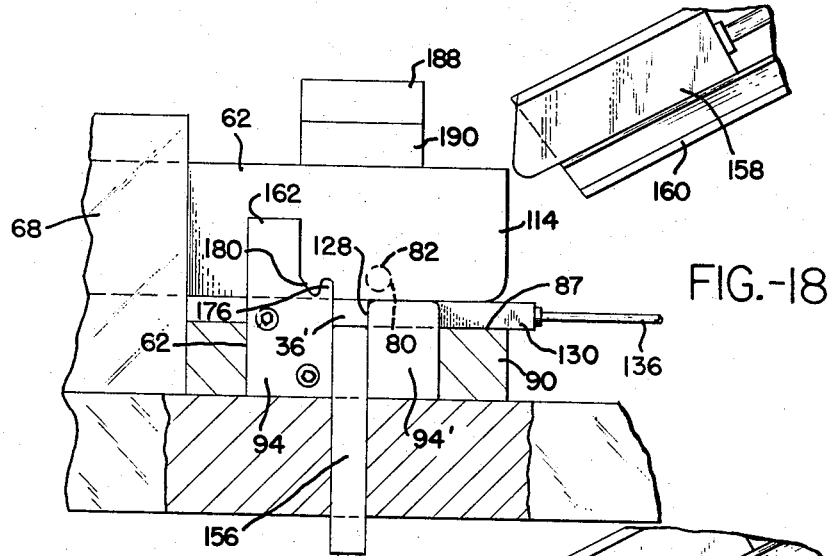
FIGURE 18 is a vertical cross section of certain parts of the apparatus and product substantially at the same stage as in FIGURES 11 and 12, but taken in a vertical plane along the line 18—18 of FIGURE 11.

FIGURES 18 and 19 show how the upwardly bent portion 42 of FIGURE 4 is formed at the left end of bar 32. Another upwardly reciprocable plunger 156 is movable through an opening 157 in the second sub-base 90 at the bottom of the second notch 99 which is also shown in FIGURES 1, 7, 8, 9, and 24. This plunger 156 moves upwardly as indicated in FIGURE 19 to form the upward bend 42 in bar 32. The upward bend 42 is bent against the side of the prong 114, as shown in FIGURE 19.

In FIGURE 20 a downwardly and leftwardly movable plunger 158 is moved down out of the channel sleeve 160 after the plunger 156 has been lowered. The plunger 158 hits the former portion 42 of FIGURE 19 and forms the zigzag formation 48 against the upper arm 162 of the stamping die 94.

FIGURE 21 shows the plunger 158 retracted and shows a second punch 164 in readiness to be pushed down by the piston-cylinder 153 simultaneously with the punch 152 in a manner so that the punches 152 and 164 straddle the prong 114. The punches 152 and 164 are carried by a piston head 166 which is pushed down by the fluid in cylinder 153.

FIGURE 22 shows how second punch 164 engages the zigzag member 48 and presses it into the shape of the member 55. The punch 164 has a head 166' which will form the flat surface portion 168 shown in FIGURES 6, 23 and 26, and force the metal to form the wedge 182' against part 162. The punch 164 also has another head 168' which will move over the edge 170 of the member 48 in FIGURE 21 and prevent the metal from flowing rightwardly. The punch also has the curved portion 172 which forms the curved portion 174 shown in FIGURES 6 and 23.

The stamping die plate 94 has a lip 176 which will form the rail edge engaging notch 178 of FIGURES 6, 23 and 26.

The stamping die plate 94 has a slanting portion 180, FIGURE 21, which will form the wedge-shaped surface or member 182' of the anchor member as shown in FIGURES 6, 23 and 26.

If desired, a small block 179, FIGURES 22 and 24, may be bolted in front of part 162 and in front of lip 176 to prevent lateral flow of metal while the wedge-shaped member 182 is being formed by the punch 164 in FIGURE 22.

FIGURE 23 shows the punch 164, the plate 130 and the prong 114 being retracted to release the anchor member for any finishing that is desired.

By reference to FIGURES 8 and 11 it will be seen that the grooves 118 between the prongs 114 and 116 forms an angle slightly larger than 90°, such as 92½°, with respect to the vertical surface 34. Therefore when the spike portion 50 of FIGURE 6 is later formed in the groove 118, as shown in FIGURE 16, and when the portion 49 of FIGURE 6 is formed against the wall 34 of FIGURE 11, the spike 50 will be at such slightly greater angle than 90° with respect to such portion 49. It causes a slight upward angular spring bias of member 49, FIGURE 26, with angle 205 as a fulcrum.

Also by reference to FIGURES 8 and 11 it will be seen that the substantially vertical edge 180 of the member 94 is at right angles to the vertical wall 34. The front portion of the prong 114 has its substantially vertical side wall 182 tapered as shown in FIGURE 8 so that it will be adjacent the vertical wall 180 when the prong moves to the full rightward position shown in FIGURE 11. This side wall 182 of prong 114 in FIGURES 8 and 11 serves as a backing for the upward bend 42 of bar 32 in FIGURE 19.

The curling pin or rod 82 is moved back and forth with the prong 116 by the cantilever construction 184, FIGURES 1 and 24, which is supported on top of the prong 116 and is bolted thereto at 186.

A long cantilever bar 188 and a short cantilever bar 190 are bolted by screw bolts 192 on top of prong 116. The bolts 192 are inserted into the tapped holes 194 in the prong 116, as shown in FIGURE 24 by dotted lines.

The bar 188 has feet 196 and 198 which are secured respectively to the block ends 200 and 202 of the piston-cylinder 204 which reciprocates the curling rod 82 back and forth into and out of the groove 118 and into and out of the hole 206 in prong 114, as indicated in FIGURES 8 and 11.

A plate 210 is welded to cantilever bar 188 and carries the spring biased plate 134. However, the plate 210 may, if desired, be supported by some stationary part of the apparatus.

All of the piston-cylinders may be operated by fluid under pressure, such as a hydraulic liquid system under pressure provided by one or more pumps. The various piston-cylinders may be controlled by automatic valves under the control of solenoids or the like. An automatic sequential control system may be provided for the electrical system that controls the solenoids and the like, such that a starting button may be operated which energizes the first solenoid to be operated, with proper holding circuit. When the part controlled by such first solenoid has performed its operation, it operates a switch that energizes the second solenoid, with proper holding circuit, and so on, until all the desired automatic operations have been automatically performed. Such automatic sequential systems are well known in industry and can be provided by manufacturers thereof. Hence such automatic sequential system is not herein further disclosed.

However, if desired, every operation may be manually and individually controlled in proper sequence, by individually controlled switches and solenoids, etc., as is obvious.

Combined spike and anchor members 31 of FIGURES 6 and 26 may be used to secure a railroad rail, as indicated in FIGURE 26. Each of a plurality of ties 54 is provided with two tie plates 53 upon each of which plates two rails 57 rest. Each tie plate 53 is provided with a plurality of openings 51 and 51' which have substantially the same cross section as the spike portion 50. Generally, four such openings 51 and 51' are provided in each tie plate 53, with two openings 51 and 51' on one side of the edge 56 of the rail flange, each opening being adjacent opposite edges of the tie plate 53 and with two openings 51 and 51' along the other edge 56' of the rail flange and similarly located.

If desired, the tie plates 53 may be provided with ridges 212 to hold the rail flange against lateral travel.

Two identical members 31 may be placed at diagonally opposed openings 51 of the tie plate 53. Two "mirror image" combined spike and anchor members may, not shown, be placed in the openings 51' of the tie plate, if desired. However, such "mirror image" members may be omitted when the expected traffic is not too heavy.

The member 31 may be driven into the tie 54 with pneumatic hammers. The openings 51 and 51' prevent the spikes 50 from rotating after they have been placed in such openings. As the spike 50 is driven into the tie, the slanting wedge member 182' wedges past the edge 56 and then the notch 178 snaps past such edge 56. The portion 49 of the member 31 holds the rail down against the tie plate 53 and tie 54, while the formation 55 and 49 holds the rail against longitudinal travel.

It is to be seen that a combined spike and anchor member 31 has been produced which has a normally vertical straight spike or spike portion 50, FIGURE 26, to be driven into the opening 51 in the tie plate 53 and which spike 50 has a normally lower pointed spike end 201 and a normally upper spike end 202. Such member 31 also has a spike head construction joined to said upper spike end 202 and including a normally upward curl portion 203 joined to said upper spike end 202, an intermediate normally vertical arch 52 and a normally downward curl portion 204 having a rail flange engaging normally vertical right angle bend 205 to engage the top of a rail flange 206.

The spike and anchor member 31 also has a main straight normally horizontal rail flange pressing portion 49 joined at one end to said vertical right angle bend 205 and normally extending longitudinally parallel to said rail on top of said rail flange 206 and having an outward normally horizontal right angle bend 207 at the other end. A straight outward normally substantially horizontal transverse rail flange pressing portion 208 is joined at one end to said outward horizontal right angle bend 207 with its second end extending to the edge 56 of the rail flange 206.

A rail flange edge engaging hook portion or formation 55 is joined to said second end and hooks normally downward around said rail flange edge 56 and has a slanting wedge portion 182' to cause said hook portion 55 to snap past and under said rail flange edge 56 when said spike and anchor member is being driven into the railroad tie 54.

To produce this combined spike and anchor member 31 an apparatus and method have been provided which include a step and means for initially slightly downwardly bending at a bending zone 209, FIGURE 2, a temporarily horizontal straight bar 32 having a pointed spike end 201 and a blunt end 210 into a spike and spike head forming curl section 37 at one side of such bending zone 209, and a rail flange pressing section and rail flange edge hooking section 36' at the other side of said bending zone 209. Such slight bending action is produced in part by the prong 114 in combination with the surface 102, FIGURES 7 and 9. A step and means are provided for temporarily bending said spike and spike head forming curl section 37 at said bending zone 209 to form a substantially right angled bend 205, FIGURE 3, initially to form the rail flange engaging bend 205 of FIGURE 26, and to form the right angled temporarily horizontal spike and curl section 38 of FIGURE 3. This bend 205 is produced mainly by the prong 116, and the bending member 70 acting against the edge of the pusher plate 130, as shown in FIGURES 10, 11 and 12.

The spike head forming curl 52 is then initially formed by a step and means for upwardly bending a portion of the right angled temporarily horizontal spike and curl section 38 to form the temporarily vertical curl and spike section 40, FIGURE 4. A step and means are provided for downwardly bending the temporarily vertical curl and spike section 40 to form the slightly bent temporarily horizontal spike section 44 and a partially formed curl section 46 of FIGURE 5. This is accomplished mainly by a curling operation around the curling pin or rod 82 by the upward bending plunger 144, FIGURE 13, and then by the downwardly slanting plunger 148, FIGURE 14.

The partially formed spike 44, FIGURE 5, is then straightened into straight spike 50 of FIGURE 6, and the partially formed curl 46 is made to include the normally upward curl portion 203, the normally vetrical arch 52, and the downward curl portion 204 of FIGURE 26.

This is accomplished mainly by a step and means which includes the action of the downward plunger 152, FIGURES 15 and 16, acting in combination with bending rod 82 and bottom member 120 of groove 118.

In the meantime the rail flange pressing and rail flange edge hooking section 36' of FIGURE 3 has its blunt end temporarily upwardly bent, as shown in FIGURE 4, to produce the main rail flange pressing member 49 to be normally horizontal and parallel to the rail 57 with the normally outward but temporarily upward right angle bend 207 at the end of the rail flange pressing member 49 and the partially formed outward rail flange pressing member 208 which is temporarily in vertical position during the forming operation of FIGURE 4. This is performed mainly by a step and means including the action of the vertical plunger 156 of FIGURES 7, 9, 10, 18 and 19 in combination with the slanting side wall 182 of prong 114.

The partially formed temporarily upward flange pressing member 42 is further bent into a zigzag member 48, FIGURE 5, mainly by the step and means including the action of the slanting plunger 158 and arm 162, FIGURE 20.

Thereafter, the zigzag member 48 is further pressed to form the normally downwardly directed rail flange edge hooking member 55, FIGURES 6 and 26, which has the wedge 182' to snap past the rail flange edge 56 when said spike and anchor member 31 is being driven into the railroad tie 54. This is accomplished by the step and means including mainly the downward plunger 164 acting with the lip 176 on plate 94 and other parts of plunger 164 and plate 94 to form the hooking member 55, wedge 182' and notch 178 as shown in FIGURES 21-23.

The combined spike and anchor members 31 which are produced by the foregoing apparatus and method can be used in combination with the rail 56, tie plate 53 and railroad tie 54 as shown in FIGURE 26. Mirror image members similar to members 31 may also be produced.

The angle of 92½° between the spike member 50 and the portion 49 causes the end of portion 49 which is adjacent to angle 205 to engage the top of flange 206 first as the spike 51 is being hammered at 52 into the tie 54. At that time, the wedge 182' has engaged the edge 56 and has sprung the portion 49 angularly outwardly from the rail with the angle member 205 as a fulcrum. Thereafter, the portion 208 is struck downwardly to cause the wedge 182' to snap over the edge 56. Because of the original 92½° angle the upper surface of wedge 182' is given an upward bias against the bottom of flange 206 while the bottom of portion 49 is sprung down tightly against the top of flange 206 by the action of wedge 182'. This produces a flange gripping action by members 49 and 182' above and below flange 206 that holds the rail 57 against longitudinal travel.

The 4° 15' angle which was produced in bar 32 causes the portion 49 and wedge 182' to be sprung horizontally angularly inwardly toward the rail 57 with angle member 205 as a fulcrum to hold the members 49 and 182' securely inwardly toward the rail.

While the form of the invention now preferred has been disclosed as required by the statutes, other forms may be used, all coming within the scope of the claims which follow.

What is claimed is:

1. An apparatus for producing a combined spike and anchor member comprising:
    means for initially slightly downwardly bending, at a bending zone, a temporarily horizontal straight bar having a pointed spike end and a blunt end into a spike and spike head forming curl section on one side of said bending zone and a rail flange pressing section and rail flange hooking section on the other side of said bending zone;
    means for temporarily horizontally bending said spike and spike head forming curl section at said bending zone to form a substantially right angled bend initially to form a rail flange engaging bend and to form a right angled temporarily horizontal spike and curl section;
    means for upwardly bending a portion of said right angled temporarily horizontal spike and curl section to form a temporarily vertical curl and spike section;
    means for downwardly bending said temporarily vertical curl and spike section to form a slightly bent temporarily horizontal spike section and a partially formed curl section;
    means for straightening said slightly bent temporarily horizontal spike section and for completing the curling of said partially formed curl section;
    means for temporarily upwardly bending an end portion of said rail flange pressing section and rail flange edge hooking section to produce a main rail flange pressing member to be normally horizontal and parallel to said rail, a normally outward but temporarily upward right angle bend joined to a temporarily upward portion to be formed into a normally outward rail flange pressing member and a normally downward flange hooking portion;
    means for further bending said last named temporarily upward portion to provide a zigzag end portion; and
    means for further pressing said zigzag portion to produce a normally downward rail flange edge hooking member with a wedge portion to snap past said rail flange edge when said spike and anchor member is being driven into a railroad tie.

2. An apparatus for producing a combined spike and anchor member from a temporarily horizonal bar having a spike producing end and an anchor producing end comprising:
    a stationary base structure having two parallel higher level first and second platforms separated by an intermediate massive block guiding groove and having respective aligned bar receiving first and second vertical end walls of a height substantially equal to the temporary vertical width of said bar;
    said stationary base structure also having a lower level platform with its top surface aligned with the lower edges of said vertical end walls, said lower level platform supporting said bar with its side against said vertical end walls and its anchor producing end adjacent said first platform;
    a massive bar bending block having two first and second prongs separated by a spike receiving groove with a sloping groove bottom and having a bar curling pin in one of said prongs movable into said spike receiving groove, said first and second prongs being slidable back and forth respectively on said first and second higher level platforms, past said vertical end walls, over said bar, and over said lower level platform, the bottom of said first prong and respective first higher level platform being transversely slightly sloped and the top surface of said lower level platform which is aligned with said first higher level platform having a corresponding transversely slightly downwardly sloped portion to produce a slight downward bend of said bar at said anchor producing end when said prongs move over said bar;

a pusher plate slidable on said downwardly sloped portion of said lower level platform and having a leading edge movable against said bar in alignment with said first vertical wall and with a side edge in alignment with the adjacent edge of said guiding groove;

a combined bar bending and guiding member on the bottom surface of said second prong movable in said guiding groove to guide said massive movable block and movable to bend the spike producing end of said bar against said side edge of said pusher plate to produce a right angled temporarily horizontal spike and curl section of said bar;

an upward bending plunger in said lower level platform movable for upwardly bending around said curling pin a portion of said right angled temporarily horizontal spike and curl section to form a temporarily vertical curl and spike section;

a downwardly slantingly movable plunger movable for downwardly bending a portion of said temporarily vertical curl and spike section around said curling pin into said spike receiving groove to form a slightly bent temporarily horizontal spike section and a partially formed curl section;

a downwardly vertically movable punch movable downwardly for straightening said slightly bent temporarily horizontal spike section and for completing the curling of said partially formed curl section;

a stampling die plate held against said slightly downwardly sloped portion of said lower level platform and having a bar receiving groove, an anchor notch forming lip and a wedge forming slanting portion, the side wall of said first prong being movable against the side of said stamping die plate;

an upwardly movable plunger adjacent said stamping die plate upwardly to bend a portion of said anchor producing end of said bar to produce a temporarily upwardly bent portion against said side wall of said first prong joined to a temporarily upward right angle portion which is joined to the remaining horizontal portion of said anchor producing end which is to form a main rail flange pressing member;

a downwardly slantingly movable plunger movable against said last named upwardly bent portion of said anchor producing end of said bar to provide a zigzag portion;

and a second downward vertically movable punch movable to press said zigzag portion to produce a normally downward rail flange edge hooking member with a wedge portion to snap past said rail flange edge when said spike and anchor member is being driven into a railroad tie.

3. An apparatus according to claim 2 in which said higher level first and second platforms are integral with said lower level platform.

4. An apparatus according to claim 2 in which said massive bending block includes a rear joining portion which is integral with the rear ends of said first and second prongs.

5. An apparatus according to claim 4 in which a piston cylinder member is provided to reciprocate said bending block, and in which another piston cylinder member is movable with said massive bending block and longitudinally actuates said bar curling pin into and out of said spike receiving groove.

6. An apparatus according to claim 2 in which said pusher plate has a spline on its lower surface reciprocable in a groove in said lower level platform, and in which a piston cylinder member moves said pusher plate to move said leading edge against said bar.

7. An apparatus according to claim 2 in which said combined bar bending and guiding member has a curved leading end to bend said bar.

8. An apparatus according to claim 2 in which said plungers and punches have piston cylinder members for moving said plungers and punches.

9. An apparatus according to claim 2 in which said first named punch has a bottom straight surface to straighten said spike section against said groove bottom, and has a curved bottom to curl said partially formed curl section around said bending pin.

10. An apparatus according to claim 2 in which said second movable punch has a first flat bottom head to form a flat surface portion on said hook portion, a curved bottom portion to form a curved portion on said hook portion and a second flat bottom head on the other side of said curved bottom portion.

11. An apparatus according to claim 2 in which said downwardly slantingly movable plungers are movable in slanting channel shaped sleeves.

12. An apparatus for producing a spike and anchor member comprising:

means for bending a straight bar having a spike forming end and an anchor forming end into a spike forming section and an anchor forming section;

means for forming said spike forming section into a normally vertical straight spike portion to be driven into an opening in a tie plate and into a railroad tie and having a normally lower spike end and a normally upper spike end and having a spike head construction joined to said upper spike end and including a normally upward curl portion joined to said upper spike end, an intermediate normally vertical arch, and a normally downward curl portion having a rail flange engaging normally vertical right angle bend to engage the top of a rail flange;

and means for forming said anchor section into a main straight normally horizontal rail flange pressing portion joined at one end to said vertical right angle bend and normally extending longitudinally parallel to said rail on top of said rail flange and having an outwardly substantially horizontal right angle bend at its other end joined to one end of a straight, outward, normally substantially horizontal transverse rail flange pressing portion with its second end extending to the edge of said rail flange, with said second end joined to a rail flange edge engaging hook portion hooking normally downward around said rail flange edge and having a wedge portion to cause said hook portion to snap past and under said rail flange when said spike and anchor member is being driven into a railroad tie.

13. An apparatus for producing a spike and anchor member from a bar having a spike forming end and an anchor forming end comprising:

means for forming a part of said bar into a normally vertical straight spike portion to be driven into an opening in a tie plate and into a railroad tie and having a normally lower spike end and a normally upper spike end and having a spike head construction joined to said upper spike end and including a normally upward curl portion joined to said upper spike end, an intermediate normally vertical arch, and a normally downward curl portion having a rail flange engaging normally vertical right angle bend to engage the top of a rail flange;

and means for forming the other part of said bar into a main straight normally horizontal rail flange pressing portion joined at one end to said vertical right parallel to said rail on top of said rail flange and angle bend and normally extending longitudinally having an outwardly substantially horizontal right angle bend at its other end joined to one end of a straight, outward, normally substantially horizontal transverse rail flange pressing portion with its second end extending to the edge of said rail flange, with said second end joined to a rail flange edge engaging hook portion hooking normally downward around said rail flange edge and having a wedge portion to cause said hook portion to snap past and under said rail flange when said spike and anchor member is being driven into a railroad tie.

References Cited

UNITED STATES PATENTS

| 1,706,274 | 3/1929 | Woodings | 72—403 |
| 1,790,951 | 2/1931 | Sampson | 72—403 |
| 2,497,297 | 2/1950 | Court | 72—403 |
| 2,480,975 | 9/1949 | Stephens | 238—315 |
| 2,293,423 | 8/1942 | Clarkson | 238—315 |
| 2,726,044 | 12/1955 | Endsley et al. | 238—315 |

CHARLES W. LANHAM, *Primary Examiner.*

ARTHUR L. LA POINT, *Examiner.*

L. A. LARSON, R. A. BERTSCH, *Assistant Examiners.*